US011341091B2

(12) United States Patent
Zbogar-Smith et al.

(10) Patent No.: US 11,341,091 B2
(45) Date of Patent: May 24, 2022

(54) CONTENT PRESERVATION AND POLICY LOCK FEATURES TO PROVIDE IMMUTABILITY FOR REGULATED COMPLIANCE

(71) Applicant: Microsoft Technology Licensing, LLC, Redmond, WA (US)

(72) Inventors: Julian Zbogar-Smith, Redmond, WA (US); Kamal Janardhan, Redmond, WA (US); Sanjay Ramaswamy, Redmond, WA (US); Le-Wu Tung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 16/386,946

(22) Filed: Apr. 17, 2019

(65) Prior Publication Data
US 2019/0324945 A1    Oct. 24, 2019

Related U.S. Application Data

(63) Continuation of application No. 15/172,252, filed on Jun. 3, 2016, now Pat. No. 10,303,780.

(51) Int. Cl.
*G06F 16/11*       (2019.01)
(52) U.S. Cl.
CPC ................................. *G06F 16/125* (2019.01)
(58) Field of Classification Search
CPC .................................................. G06F 16/125
See application file for complete search history.

(56) References Cited

U.S. PATENT DOCUMENTS

| 7,051,366 | B1 | 5/2006 | LaMacchia et al. |
| 7,233,948 | B1 | 6/2007 | Shamoon et al. |
| 7,748,045 | B2 | 6/2010 | Kenrich et al. |

(Continued)

OTHER PUBLICATIONS

Amazon S3 Glacier Developer Guide API Version Jun. 1, 2012 (Year: 2012).*

(Continued)

*Primary Examiner* — Hau H Hoang
(74) *Attorney, Agent, or Firm* — Michael Best & Friedrich LLP

(57) ABSTRACT

Customers in regulated industries face demanding compliance regulations, including content immutability. While broadened to allow software-based solutions, the regulations for immutability require content preservation to prevent overwriting, erasure or alteration of the content, where the preservation must be implemented through irrevocable features. Embodiments are directed to provision of an administrative user experience to enable customers to create a preservation policy that defines item(s) to be preserved. After detecting enablement of the policy, the item(s) may be preserved, a preservation lock on the policy may be initiated by disabling controls associated with the policy, and an attribute may be set to the policy to identify the policy as locked. Preservation of the item(s) may prevent content of the item(s) from being overwritten, erased, and/or altered, and the preservation lock on the policy may prevent alteration and/or revocation of the policy for a duration of the lock to satisfy the regulations.

20 Claims, 14 Drawing Sheets

(56) References Cited

U.S. PATENT DOCUMENTS

| | | |
|---|---|---|
| 7,814,063 B1 | 10/2010 | Kilday et al. |
| 8,121,024 B1 | 2/2012 | Natarajan et al. |
| 8,655,307 B1 | 2/2014 | Walker et al. |
| 2005/0055518 A1* | 3/2005 | Hochberg ............. G06F 16/122 711/159 |
| 2015/0248419 A1* | 9/2015 | Motoyoama .......... G06F 16/125 726/1 |

OTHER PUBLICATIONS

"Meet Regulatory Storage Requirements with Amazon Glacier Vault Lock", Retrieved from: https://aws.amazon.com/about-aws/whats-new/2015/07/meet-regulatory-storage-requirements-with-amazon-glacier-vault-lock/#targetText=Amazon%20Glacier%20Vault%20Lock%20allows,the%20policy%20from%20future%20edits., Jul. 8, 2015, 3 Pages.

Sloman, Morris, "Policy Driven Management for Distributed Systems", In the Journal of Network and Systems Management, vol. 2, Issue 4, Dec. 1, 1994, pp. 333-360.

* cited by examiner

CONTENT PRESERVATION AND POLICY LOCK FEATURES TO PROVIDE IMMUTABILITY FOR REGULATED COMPLIANCE

RELATED APPLICATIONS

This application is a continuation of U.S. application Ser. No. 15/172,252 filed Jun. 3, 2016, the entire content of which is incorporated by reference herein.

BACKGROUND

Customers in regulated industries, such as the financial and healthcare industries, face demanding compliance regulations. Such regulations initially required hardware-based solutions for immutability, where immutability refers to the preservation of data in a guaranteed, tamper-proof manner. Therefore, immutability has been achieved historically by storing a copy of all data in dedicated archiving storage that is inherently designed on Write-Once, Read-Many-based (WORM-based) hardware media. More recently, in recognition of technological progression, many regulated industries have broadened their compliance regulation requirements to include both software and hardware-based solutions for immutability. However, the solutions must not only prevent the overwriting, erasure or alteration of data, but must also be implemented as features that cannot be turned off or removed to remain in compliance.

Hardware-based solutions are still most often used to provide immutability for regulated compliance, but these solutions may be extremely expensive due to the need for specialized hardware and implementation in an isolated environment, which requires specialized expertise, as well as additional security, auditing, retention, and electronic discovery requirements. Additionally, utilizing hard-based solutions, such as WORM-based hardware media, may make it difficult for customers to upgrade and/or migrate their data. Accordingly, methods for providing immutability could be greatly improved through the implementation of preservation policies that, upon enablement, immutably preserve items to prevent the overwriting, erasure, or alteration of data or content within those items, and have the ability to be locked such that the policies cannot be turned off or removed in compliance with the industry regulations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to methods and systems to provide content immutability for regulated compliance. An administrative user experience may be provided to enable a customer to create a preservation policy, where the preservation policy defines an item to be preserved based on one or more item properties. Upon detection that the preservation policy has been enabled, the item may be preserved to prevent content of the item from being one or more of overwritten, erased, and altered, and a lock on the preservation policy may be initiated by disabling one or more controls associated with the preservation policy to prevent one of alteration and revocation of the preservation policy for a duration of the lock. An attribute may then be set to the preservation policy to identify the preservation policy as locked.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
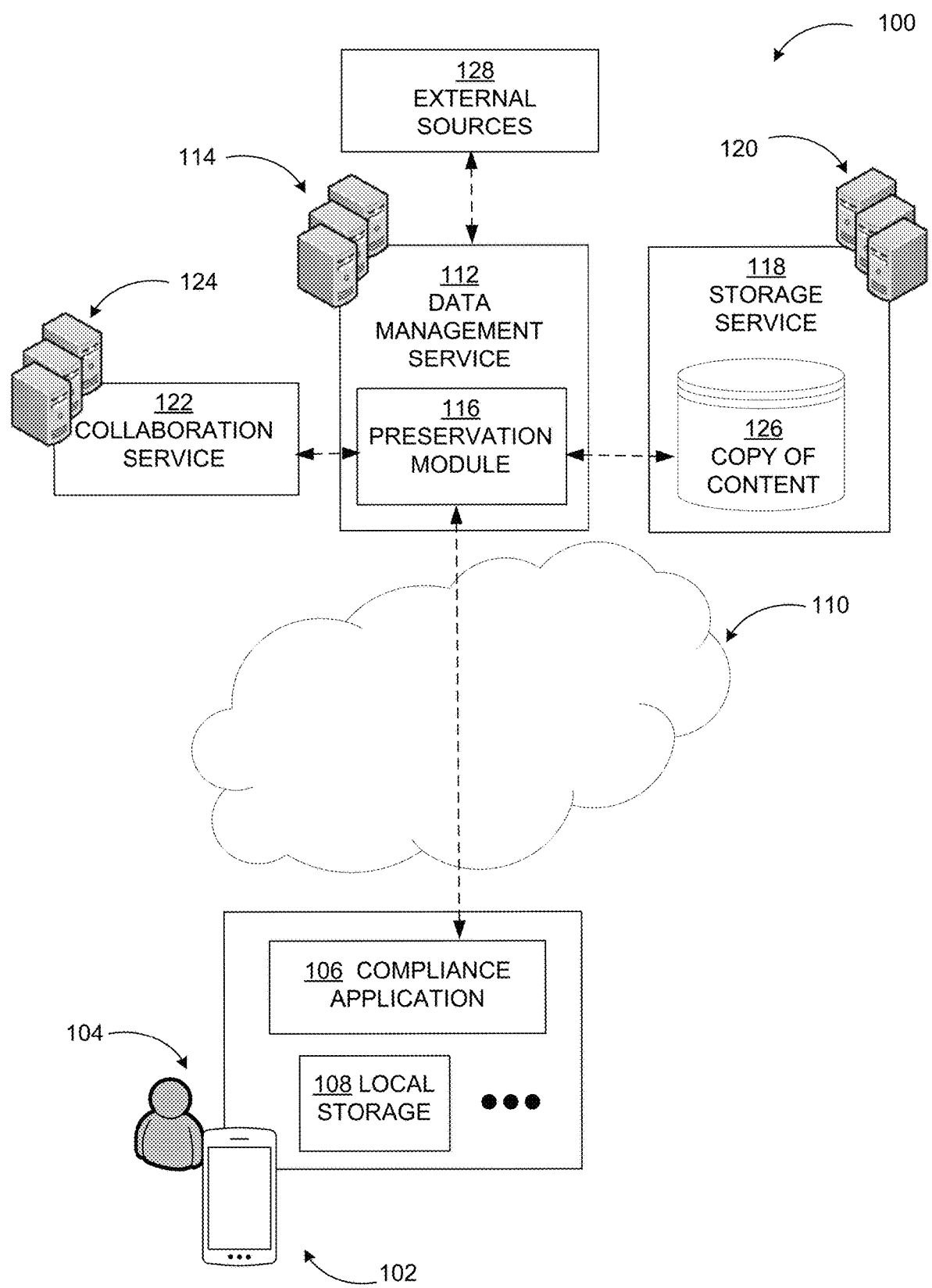
FIG. 1 includes an example network environment where a system for providing content immutability may be implemented.

As briefly described above, an administrative user experience may be provided to enable a customer to create a preservation policy that defines items to be preserved based on one or more item properties. The preservation policy may be configured to have a preservation lock. In response to a detection that the preservation policy has been enabled, the items may be preserved, a lock on the preservation policy may be initiated by disabling one or more controls associated with the preservation policy, and an attribute may be set to the preservation policy to identify the preservation policy as locked. Preservation of the items may prevent content of the item from being overwritten, erased, and/or altered, and the lock on the preservation policy may prevent alteration and/or revocation of the preservation policy for a duration of the lock in compliance with the regulation requirements for immutability.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing content immutability for regulated compliance. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system for providing content immutability may be implemented.

As illustrated in diagram 100, a customer 104 may execute a thick (e.g., a locally installed client application) version of a compliance application 106 through a device 102. The device 102 may include a desktop computer, a laptop computer, a tablet computer, a vehicle mount computer, a smart phone, or a wearable computing device, among other similar devices. A data management service 112 hosted by one or more data management servers 114 may be associated with the compliance application 106 that is being executed on the device 102. The data management service 112 may include a preservation module 116 configured to provide an administrative user experience through the compliance application 106 to enable the customer 104 to create, enable, and manage a preservation policy. A communication interface may facilitate communication between the data management service 112, the device 102, a plurality of other services running on a same platform as the data management service 112, such as a storage service 118 hosted by one or more storage servers 120 and a collaboration service 122 hosted by one or more collaboration servers 124, and one or more external sources 128 over one or more networks, such as network 110.

The preservation policy created by the customer 104 may define items to be preserved based on one or more item properties, and may be configured to have a preservation lock. The items may include a mailbox, an email message, a site, a document, a file, a folder, and/or third-party data, and the item properties may include an organization, a group, a user, a location, a folder type, a file type, a document type, and/or a data type, for example. If one of the items to be preserved is third party data, the data management service 112 may be configured to retrieve the third party data from the external sources 128 based on a customer-defined scope of third party data to be preserved by the preservation policy.

In response to a detection that the customer 104 has enabled the preservation policy, the preservation module 116 may be configured to preserve the items and initiate the preservation lock on the preservation policy. Preservation of the items ensures that content of the items cannot be overwritten, erased, or altered. The preservation module 116 may start preserving the items upon detection of a modification to content of the items or upon receipt of the items based on a type of each of the items. For example, if the item is an email message, the preservation module 116 may be configured to preserve the email message upon receipt. For further example, if the item is a file, the preservation module 116 may be configured to preserve the file upon detection of a modification to content within the file. The preservation module 116 may be configured to initiate the preservation lock on the preservation policy by disabling one or more controls associated with the preservation policy to prevent alteration or revocation of the preservation policy for a duration of the lock. The disabled controls may include controls configured to decrease the duration of the lock, to remove items from the preservation policy, and to revoke the preservation lock or turn off the preservation policy altogether.

The preservation module 116 may then be configured to attach an attribute to the preservation policy to identify the preservation policy as locked, and update the administrative user experience provided to the customer 104 to indicate a current status of the preservation policy as "ON" or "LOCKED". Additionally, the preservation module 116 may be configured to collect metadata associated with the lock, such as a date and a time the preservation policy was locked, the customer 104 who created the lock, the preserved items defined by the locked preservation policy, and the duration of the lock, to be displayed through the administrative user experience. In some embodiments, the preservation module 116 may also be configured to audit the preserved items and the locked preservation policy to determine whether compliance regulations are satisfied.

The preserved items may remain at a current location of the items after the preservation policy is locked. For example, the preserved items may be stored locally at local storage 108 of the device 102 and/or remotely at data stores managed by the data management service 112, or by third party services, such as storage service 118. However, the preservation module 116 may also be configured to transmit a copy of the content 126 of the preserved items to the storage service 118 for at least the duration of the lock. In some embodiments, the copy of the content 126 may be stored with other content in a database of the storage service 118, as shown. In other embodiments, a copy of the content 126 may be stored separately. Additionally, the preserved items may be enabled to be queried at the storage service 118. For example, the preserved items may be need to be searchable to fulfill electronic discovery requirements of the compliance regulations.

Additionally, in some embodiments, the preservation module 116 may be configured to synchronize the preservation policy with the collaboration service 122. By synchronizing the preservation policy, items may be preserved when their content is modified or the item is received at the collaboration service 122. The preservation policy may also remain locked at the collaboration service 122 to prevent alteration or revocation of the preservation policy at the collaboration service 122. In other embodiments, the preservation module 116 may be configured to synchronize the preservation policy with other services running on different platforms than the data management service 112 if the other services recognize and respect the attribute set to the preservation policy to identify the preservation policy as locked.

Currently, hardware-based solutions are most often used to provide content or data immutability, but these solutions may be extremely expensive due to the need for specialized hardware and implementation in an isolated environment, which requires specialized expertise, as well as additional security, auditing, retention, and electronic discovery requirements. Additionally, utilizing hard-based solutions may make it difficult for customers to upgrade and/or migrate their data. While government or regulatory body regulations initially required hardware-based solutions for immutability to satisfy compliance regulations, many of the regulations have broadened requirements to include both software and hardware-based solutions for immutability in recognition of technology progression. However, to satisfy the requirement, the solutions must not only prevent the overwriting, erasure or alteration of data, but must also be implemented as features that cannot be turned off or removed. For example, once a request or policy to immutably preserve data has been issued, there should be no ability to revoke such a request or policy; or, if such an ability exists, it is available only with highly privileged, secure and audited access.

The system, as described in FIG. 1, preserves items defined by a preservation policy and initiates a lock on the preservation policy upon detecting enablement of the preservation policy. Preservation of the items prevents content of the items from being overwritten, erased, or altered, and locking the preservation policy prevents alteration or revocation of the preservation policy for a duration of the lock, in compliance with the above-stated requirements. The content preservation and policy lock features are implemented within an existing platform (that is, not in a separate isolated environment), where the existing platform offers security, auditing, retention, and query capabilities for electronic discovery. Therefore, implementation no longer requires expertise in specialized hardware, additional security, auditing, retention, or electronic discovery requirements, which may greatly reduce cost. Also, implementation of the content preservation and policy lock features on the existing platform may enable a customer to fulfill all compliance needs through that single platform, instead of across multiple, incompatible platforms, which is of great convenience to the customer.

Additionally, the ability of the system to synchronize immutable preservation and lock features with other services running on a same or different platform may enable the customer to more easily upgrade and/or migrate items or content of the items. Furthermore, the administrative user experience provided for creation, enablement, and management of the preservation policy by the customer may increase user interactivity. As described in further detail below, the user experiences and dialog box sequences may also improve user efficiency when interacting with the preservation policy.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of customers and applications that must meet demanding compliance regulations.

Figure 2:
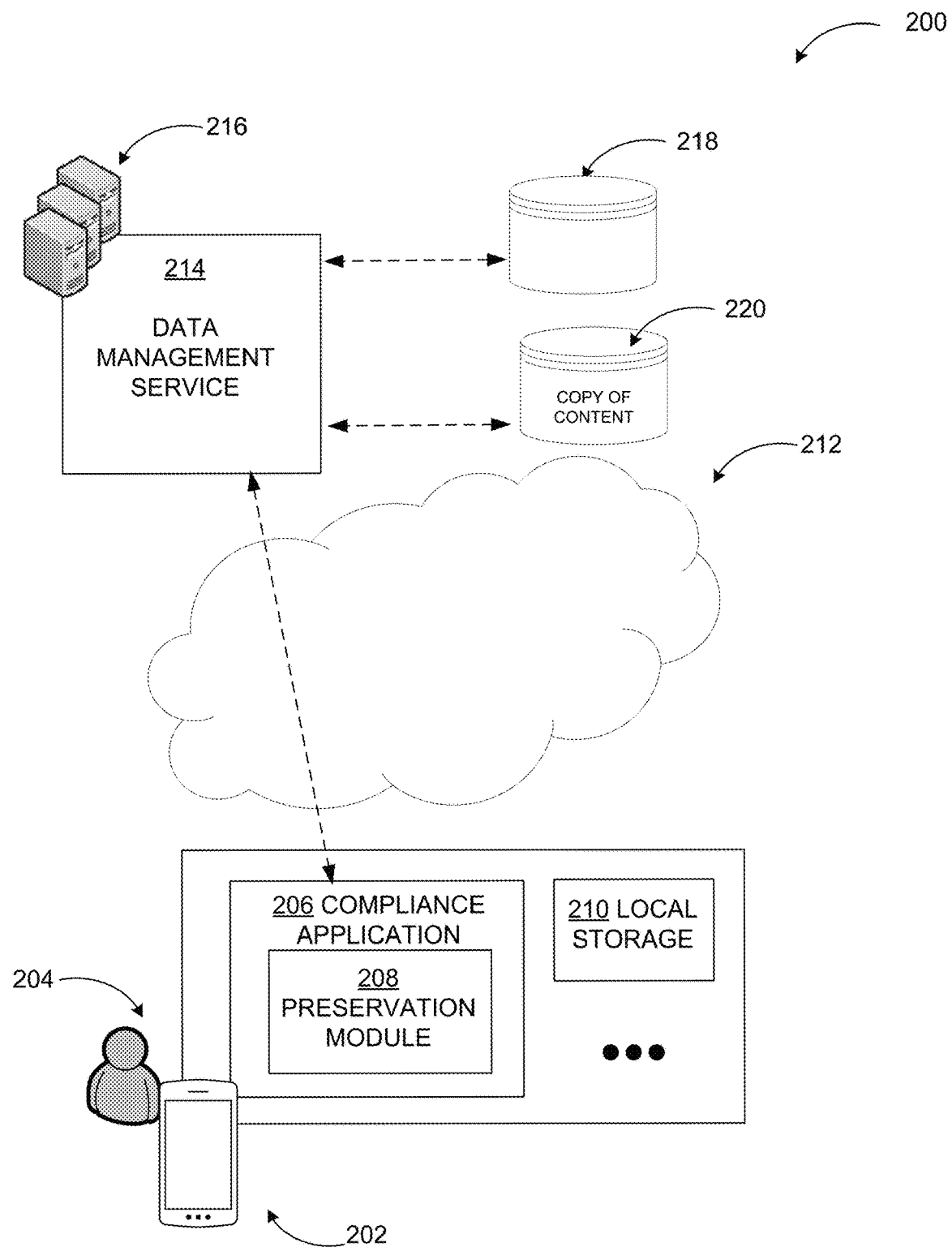
FIG. 2 includes another example network environment where a system for providing content immutability may be implemented.

FIG. 2 includes another example network environment where a system for providing content immutability may be implemented.

As illustrated in diagram 200, a customer 204 may execute a thick (e.g., a locally installed client application) version of a compliance application 206 through a device 202. The device 202 may include a desktop computer, a laptop computer, a tablet computer, a vehicle mount computer, a smart phone, or a wearable computing device, among other similar devices. A data management service 214 hosted by one or more servers 216 may be associated with the compliance application 206 that is being executed on the device 102. The compliance application 206 may include a preservation module 208 configured to provide an administrative user experience through the compliance application 206 to enable the customer 204 to create, enable, and manage a preservation policy. A communication interface may facilitate communication between the data management service 214, the device 202, and one or more data stores 218 and 220 managed by the data management service 214, over one or more networks, such as network 212.

The preservation policy created by the customer 204 through the administrative user experience may define items to be preserved based on one or more item properties, and may be configured to have a preservation lock. The items may include a mailbox, an email message, a site, a document, a file, a folder, and/or third-party data, and the item properties may include an organization, a group, a user, a location, a folder type, a file type, a document type, and/or a data type, for example. In an example scenario, the customer 204 may be a large company comprised of many different departments such as financial, legal, human resources, and public relations, where some of those departments, such as financial or legal, may have more strict compliance regulations. Thus, the customer 204 may define that all items having a "financial" group property need to be preserved.

Once the preservation module 208 detects that the customer 204 has enabled the preservation policy through the administrative user experience, the preservation module 208 may be configured to preserve the items defined by the preservation policy to ensure that content of the items cannot be overwritten, erased, or altered. The preservation module 208 may begin to preserve the items upon detection of a modification to content of the items or upon receipt of the items based on a type of each of the items. The preserved items may remain at a current location of the items after the preservation policy is locked. For example, the preserved items may be stored locally at local storage 210 of the device 202 and/or remotely at the data store 218 managed by the data management service 214, or by third party services, such as storage service. However, the preservation module 208 may also be configured to transmit a copy of the content of the preserved items to be stored separately at the data store 220 from other content stored at the data store 218 for at least the duration of a lock placed on the preservation policy as described below.

Simultaneously, the preservation module 208 may be configured to initiate the preservation lock on the preservation policy by disabling one or more controls associated with the preservation policy to prevent alteration of the preservation policy for a duration of the lock. The disabled controls may include controls configured to decrease the duration of the lock, to remove items from the preservation policy, and to revoke or turn off the preservation policy, where the latter two controls may be re-enabled following expiration of the duration of the lock. Other controls associated with the preservation, such as controls configured to increase the duration of the lock and to add items to the preservation policy may be maintained throughout the duration of the lock. The preservation module 208 may then be configured to attach an attribute to the preservation policy to identify the preservation policy as locked, and update the administrative user experience provided to the customer 204 to indicate a current status of the preservation policy as "ON" or "LOCKED".

Figure 3:
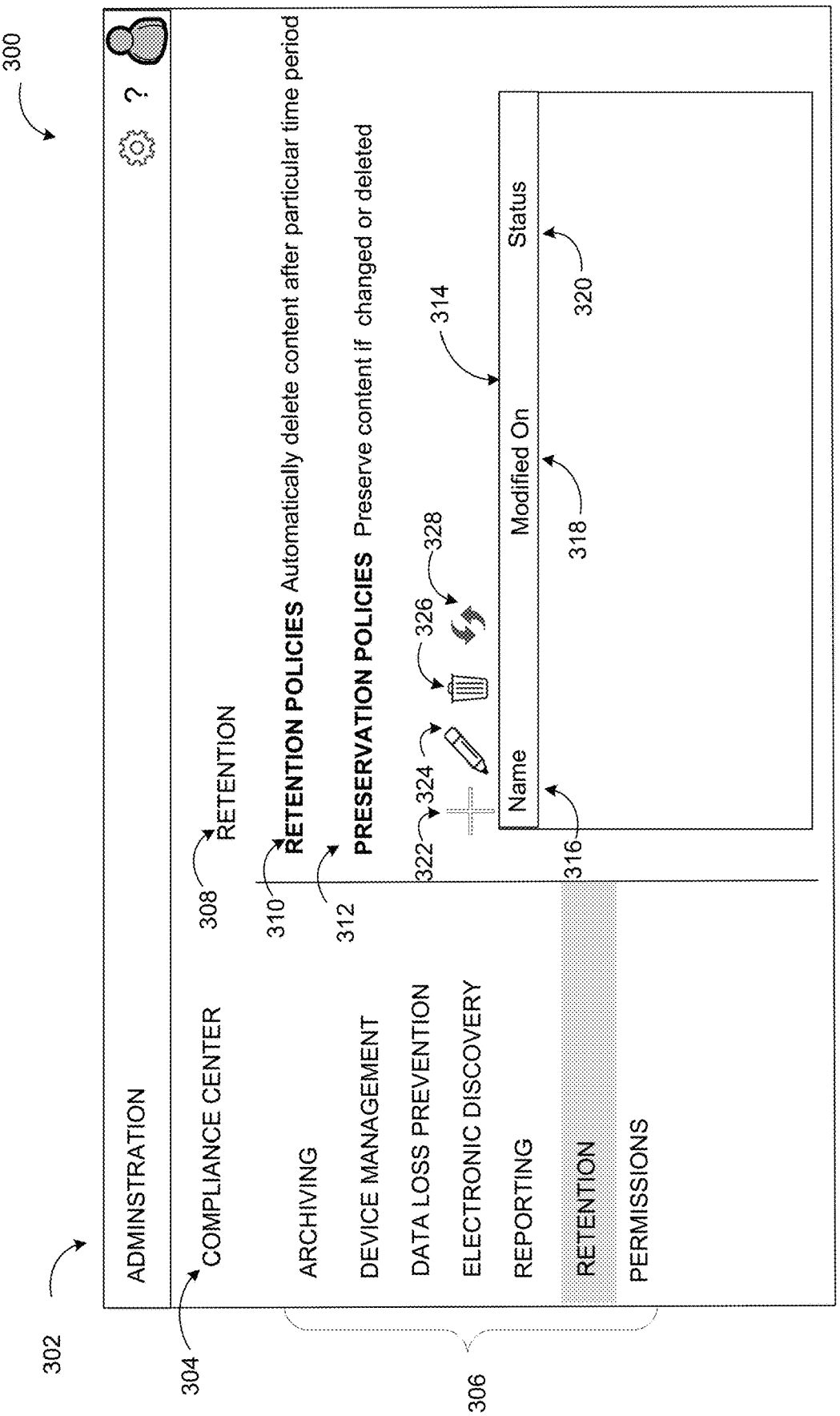
FIG. 3 illustrates an example administrative user experience provided for management of preservation policies.
Figure 4A:
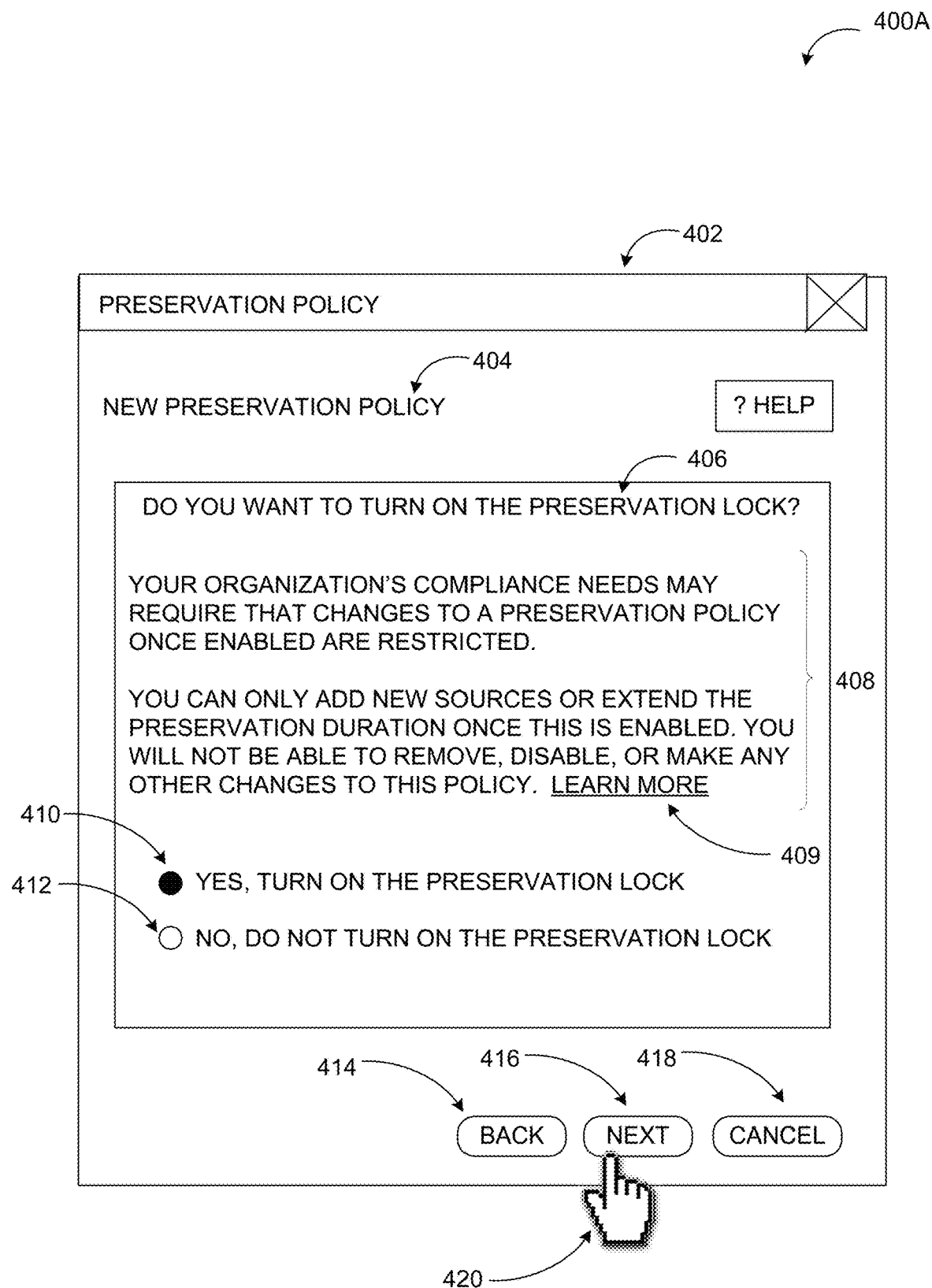
FIGS. 4A-D illustrate an example sequence of dialog boxes provided for configuration and initiation of a preservation lock.
Figure 4B:
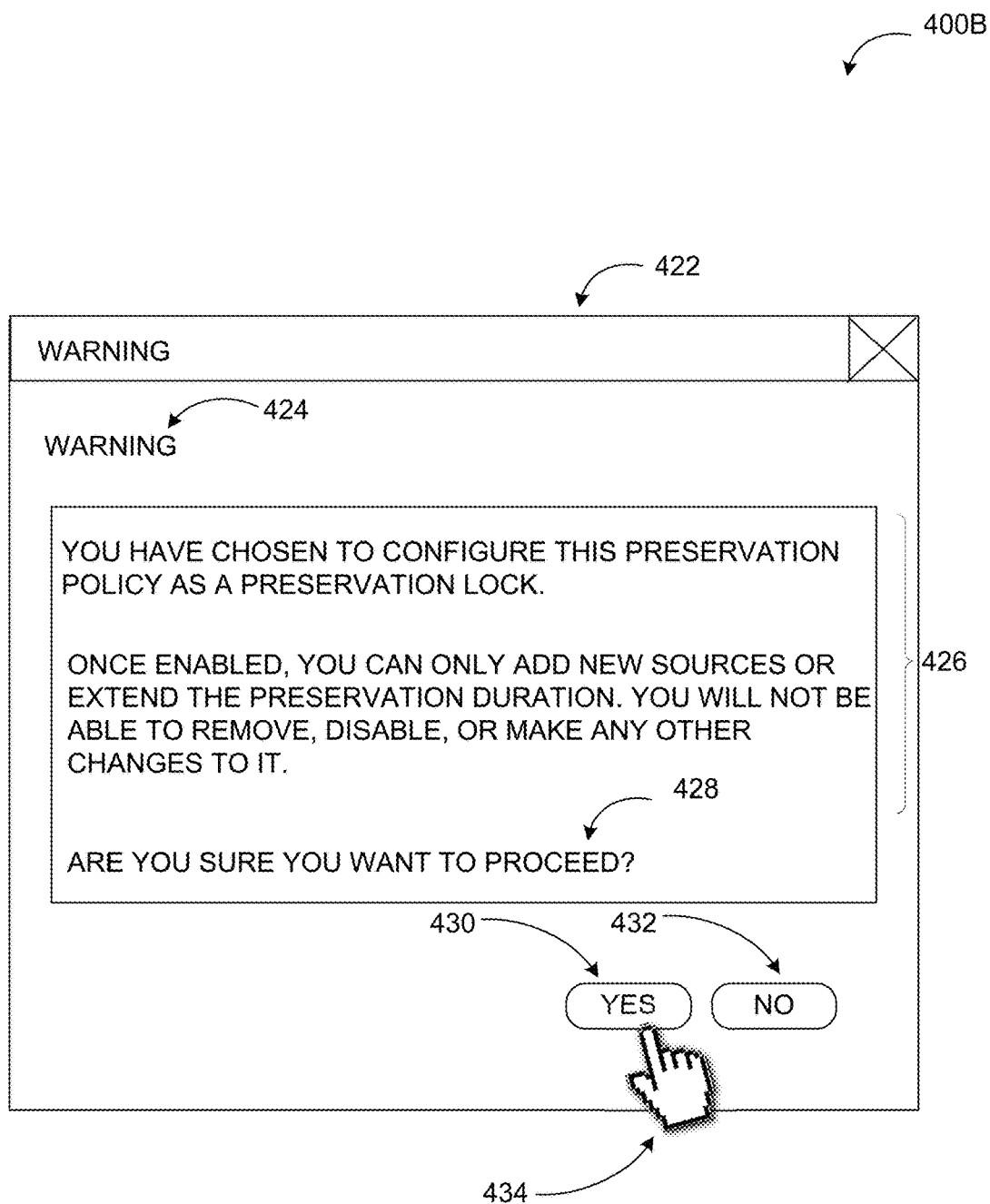
Figure 4C:
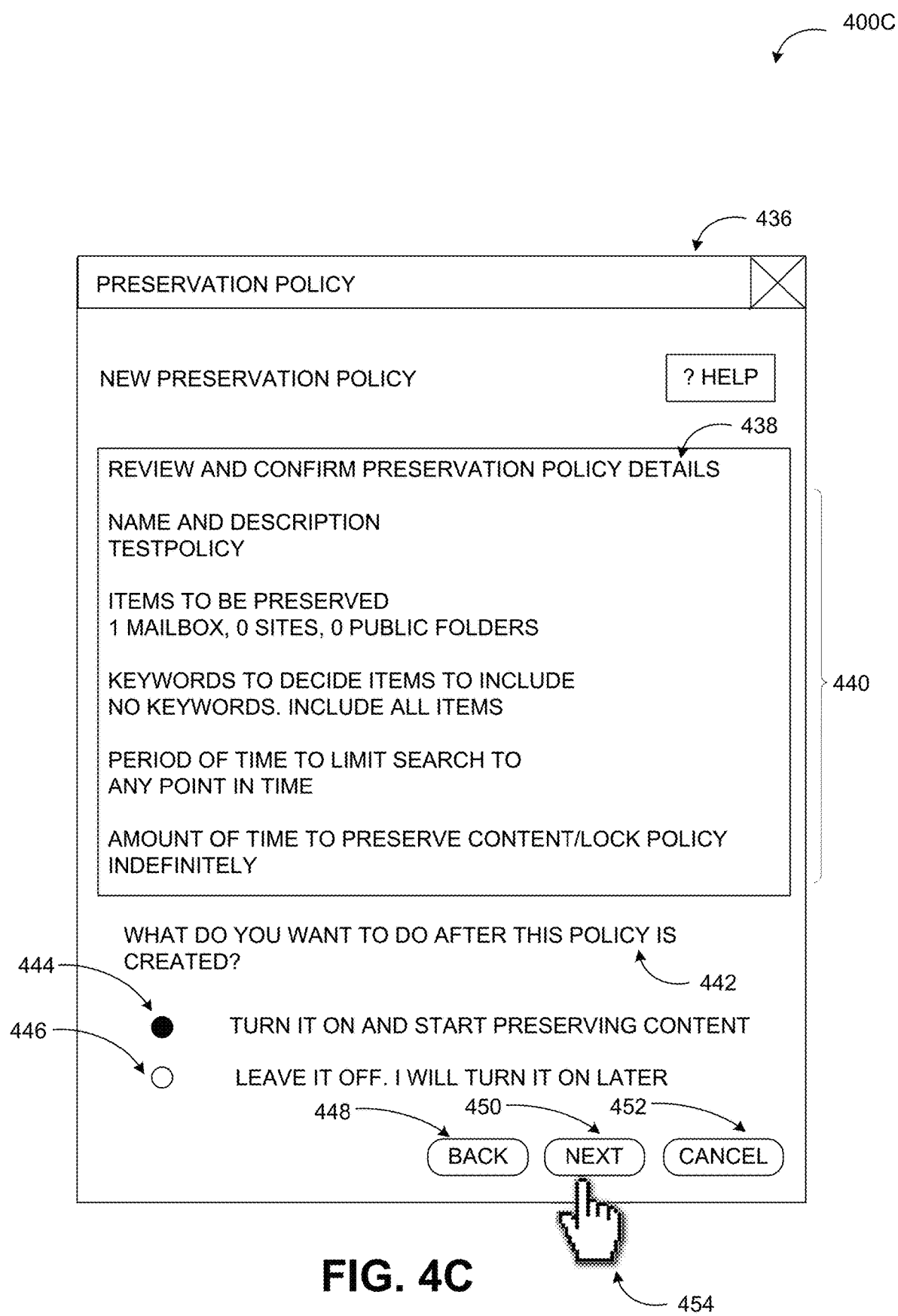
Figure 4D:
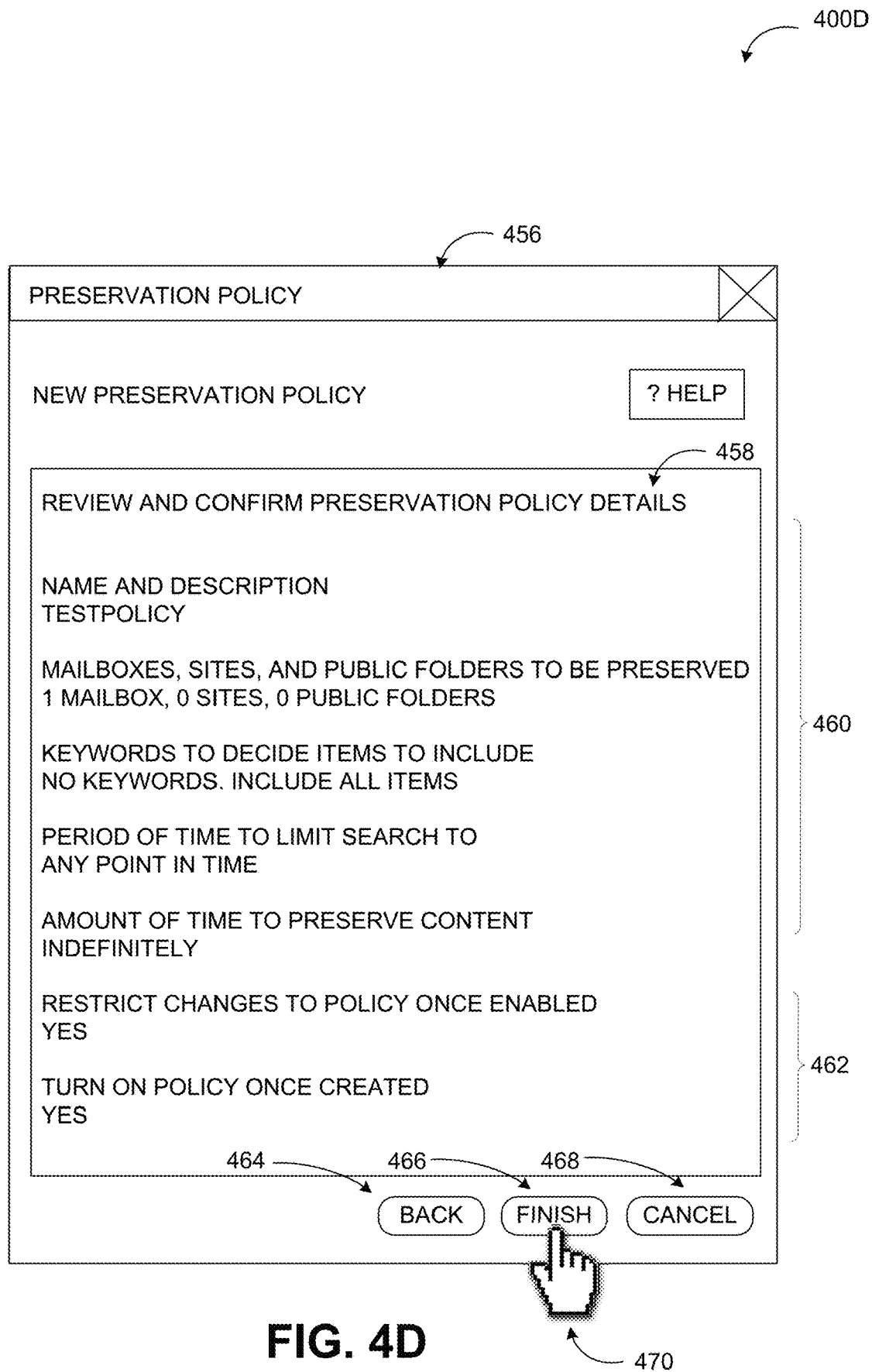

FIG. 3 illustrates an example administrative user experience provided for management of preservation policies.

As shown in a diagram 300, an administrative user experience 302 may be provided to a customer through a compliance application executed on a computing device, for example. Among other things, the administrative user experience 302 may include a compliance center view 304 offering one or more compliance-based features 306, such as archiving, data management, data loss prevention, electronic discovery, reporting, retention, and permissions, that may be managed by the customer through the administrative user experience 302. Upon selection of the retention feature 308, the customer may be enabled to create, enable, or manage a retention policies 310 and/or preservation policies 312. The retention policies 310 define types of content to be deleted and a particular time period after which to automatically delete the defined types of content. The preservation policies 312 may define items to be preserved based on one or more item properties, and may be configured to have preservation locks. Once the preservation policies 312 are enabled, the respective items may be preserved to prevent overwriting, erasure, and/or alteration of content of the items, and the preservation policies 312 may be locked to prevent any alterations, including revocation of, the preservation policies 312 for a duration of the lock. In some embodiments, the preservation policies 312 may be combined with the retention policies 310 such that upon expiration of the duration of the lock, the items may be automatically deleted in accordance with the retention policies 310.

In an example embodiment, a policy list view 314 may be provided to enable the customer to create, enable, or manage the retention policies 310 and the preservation policies 312. Each policy may be displayed by name 316, a date and a time of most recent modification 318, and a status 320 (that is, whether the policy is on/locked or off) through the policy list view 314. Graphic controls may also be provided to enable the customer to create new policies or add new items to existing policies 322, modify existing policies 324, revoke existing policies 326, and update 328 the policy list view 314 to indicate a current status of the policies. However, if the customer selects a locked preservation policy to manage, the graphic controls to modify existing policies 324 and revoke existing policies 326 may be disabled. Additionally, an error message may be displayed in response to detecting an attempt by the customer to actuate the graphic controls to modify existing policies 324 and revoke existing policies 326 when managing the locked preservation policy.

FIGS. 4A-D illustrate an example sequence of dialog boxes provided for configuration and initiation of a preservation lock.

As previously discussed, a preservation module may provide an administrative user experience through a compliance application that is being executed on a customer device. In response to detecting a request to create a preservation policy through the administrative user experience (e.g., detecting customer selection of the graphic control to create new policies or add new items to existing policies 322 in FIG. 3), a wizard or setup assistant, for example, may be launched to present the customer with a sequence of dialog boxes that lead the user through a series of well-defined steps to configure and initiate a preservation lock on the preservation policy, as shown in diagrams 400A-400D.

In diagram 400A, a first dialog box 402 may be provided in response to creation of a new preservation policy 404. The first dialog box 402 may present a main instruction 406 to the customer regarding whether or not the customer wants to configure the new preservation policy to have a preservation lock. The main instruction 406 may be presented in the form of a question "Do you want to turn on the preservation lock?" and at least two selectable controls 410 and 412 may be provided to enable the customer to respond "yes" or "no" to the main instruction 406, respectively. The first dialog box 402 may also provide a first prompt 408 to describe reasons for and/or the effect of configuring the new preservation policy to have a preservation lock. For example, the first prompt 408 may inform the customer that restricting changes to the preservation policy may be required for compliance needs. The first prompt 408 may also inform the customer that only new items may be added to the preservation policy and a duration of a lock (or restriction) on the policy may only be increased. A selectable link 409 to a site comprising more detailed information regarding preservation locks may further be provided in the event the customer is not satisfied with the information provided in the first dialog box 402.

After selection of control 410 to respond "yes" to the main instruction 406 to configure the new preservation policy to have a preservation lock, the customer may select one of three commands, a back command 414, a next command 416, and a cancel command 418. In response to a customer selection 420 of the next command 416, as shown, a second dialog box may be presented. Alternatively, if the back command 414 or cancel command 418 is selected, the customer may be returned to the administrative user experience.

In diagram 400B, a second dialog box 422 presents a warning 424 to the customer, and a main instruction 428 regarding whether the customer wants to proceed with configuring the new preservation policy to have a preservation lock. A prompt 426 is provided to confirm that the customer has selected to configure the new preservation policy to have a preservation lock, and to remind the customer that only new items may be added to the policy and a duration of a lock (or restriction) on the policy may only be increased. No other alterations, including revocation may be made to the policy once the preservation lock is initiated. The customer may select one of two commands, a yes command 430 and a no command 432. In response to a customer selection 434 of the yes command 430 as shown, a third dialog box may be presented. Alternatively, if the no command 432 is selected, the customer may be returned to the administrative user experience.

In diagram 400C, a third dialog box 436 may be presented to enable the customer to review and confirm details of the configuration of the new preservation policy 438. For example, details 440, such as a name and description of the new preservation policy, items to be preserved as defined by the new preservation policy, and a duration of content preservation and restriction (or lock) on the new preservation policy, among others, may be provided for display through the third dialog box 436. The third dialog box 436 may also present a main instruction 442 regarding whether to automatically turn on or leave off the new preservation policy once it is created. The main instruction 442 may be in the form of a question, "What do you want to do after this policy is created?" and at least two selectable controls 444 and 446 may be provided to enable the customer to respond "turn it on" or "leave it off" to the main instruction 442, respectively.

After selection of one of the controls 444 or 446, the customer may then select one of three commands, a back command 448, a next command 450, and a cancel command 452 through the third dialog box 436. As illustrated, control 444 has been selected to respond "turn it on" to the main instruction 442, followed by the next command 450. In response to the customer selection 454 of the next command 450, a fourth dialog box is presented. Alternatively, if the back command 448 command is selected, the customer may be returned to a previous dialog box, or if the cancel command 418 is selected, the customer may be returned to the administrative user experience. In an alternate embodiment, the main instruction 442, selectable controls 444 and 446, and commands 448, 450, and 452, may be displayed separately from the details 440 through another dialog box provided subsequently in the sequence to improve readability for the customer.

In diagram 400D, a fourth dialog box 456, may be presented to enable the customer to again review and confirm details of the configuration of the new preservation policy 458, similar to the third dialog box. Details 460 similar to the details displayed in the third dialog box may be re-presented in the fourth dialog box, such as a name and description of the new preservation policy, items to be preserved as defined by the new preservation policy, and a duration of content preservation and restriction (or lock) on the policy, among others. Additional details 462 may also be presented such as whether the policy is configured to have a preservation lock, and whether or not the policy is to be turned on once created based on the customer selections in the previous dialog boxes. After review and confirmation, the customer may select one of three commands, a back command 464, a finish command 466, and a cancel command 468. In response to a customer selection 470 of the finish command 466, as shown, the new perseveration policy (configured to have a preservation lock) may be created and turned on, which triggers content preservation and initiation of the preservation lock on the policy. In some embodiments, another warning prompt, similar to the warning prompt illustrated in diagram 400B may be repeated prior to creation to ensure that the customer really does want to create and initiate a preservation lock due to the inability to revoke or change the preservation policy once it has been enabled for at least a duration of the lock placed on the policy. Alternatively, if the back command 464 is selected, the customer may be returned to the previous dialog box, or if the cancel command 468 is selected, the customer may be returned to the administrative user experience.

Figure 5:
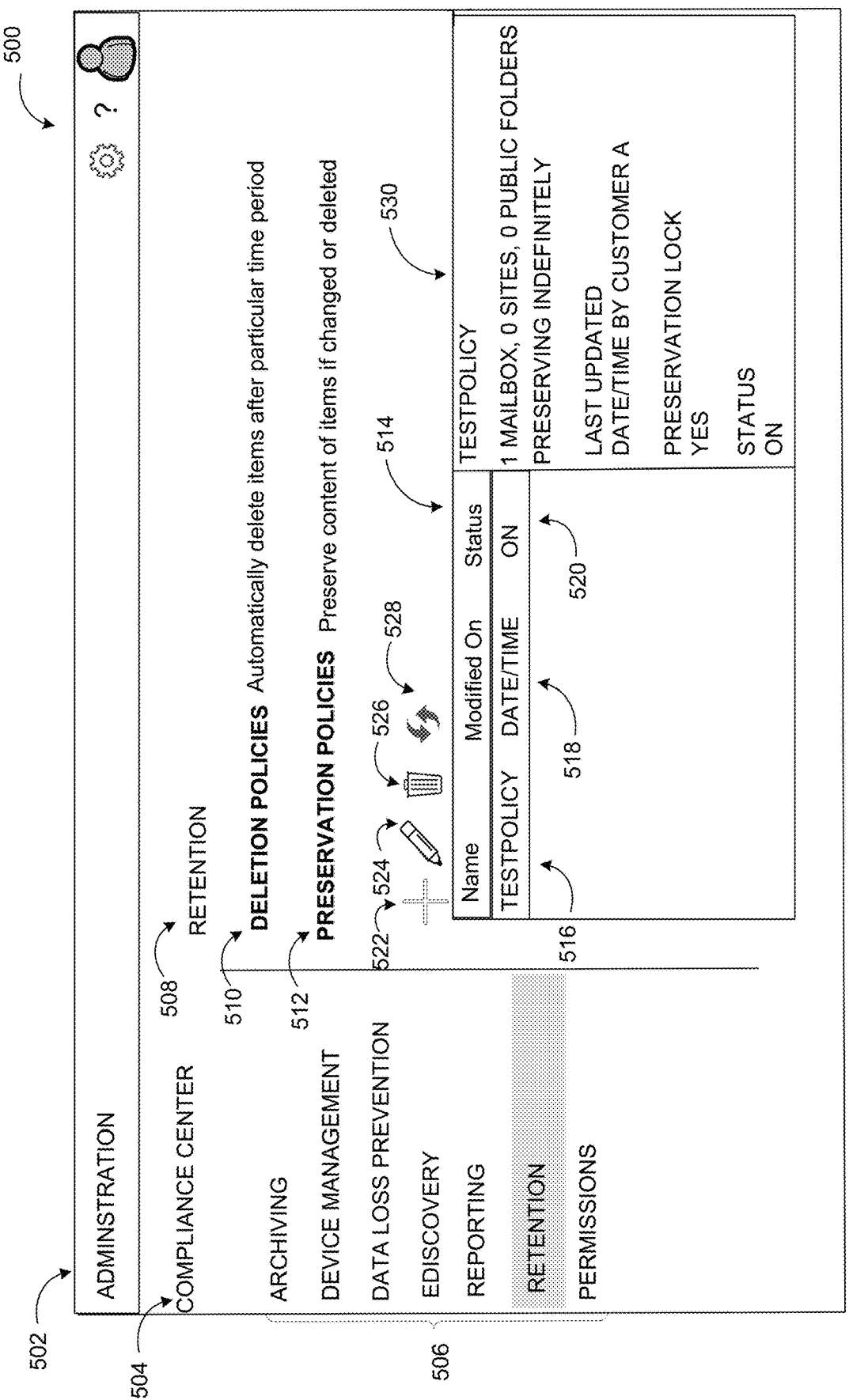
FIG. 5 illustrates an example of an updated administrative user experience.

FIG. 5 illustrates an example of an updated administrative user experience.

As shown in a diagram 500, an updated administrative user experience 502 may be provided to a customer to indicate a recently enabled preservation policy as locked through a compliance application executed on a customer device, for example. As previously discussed in conjunction with FIG. 3, the administrative user experience 502 may include a compliance center view 504 offering one or more compliance features 506, such as archiving, data management, data loss prevention, electronic discovery, reporting, retention, and permissions, that may be managed by the customer through the administrative user experience 502.

Upon selection of the retention feature 508, the customer may be enabled to create new or manage existing (and potentially locked) preservation policies 512 through a policy list view 514 provided. For example, graphic controls are provided to enable the customer to create new policies or add new items to existing policies 522, modify existing policies 524, revoke existing policies 526, and update 528 the policy list view 514 to indicate a current status of the policies. However, if the customer selects an existing preservation policy that is locked for management, the graphic controls to modify existing policies 524 and revoke existing policies 526 may be disabled for the duration of the lock to prevent the preservation policy from being altered or revoked.

In an example scenario, a customer may create a test preservation policy through the retention feature 508 of the administrative user experience 502 to determine whether compliance regulations are met. The test preservation policy may define a mailbox to be preserved. Once the test preservation policy is enabled, the mailbox may be preserved, the test preservation policy may be locked, and an attribute may be set to the test preservation policy to identify it as locked. The administrative user experience 502 may then be updated to indicate the current status of the test preservation policy as on or locked. For example, the test preservation policy may be displayed by name 516 ("TESTPOLICY"), a date and a time of most recent modification 518 ("DATE/TIME"), and a status 520 ("ON") through the policy list view 514. Additionally, if a customer selects or hovers over a locked preservation policy within the policy list view 514, metadata 530 associated with the lock may be displayed adjacent to the policy list view 514. The metadata 530 may include a date and a time the preservation policy was locked, the customer who created the lock, the preserved item(s) defined by the locked preservation policy, and the duration of the lock.

Figure 6A:
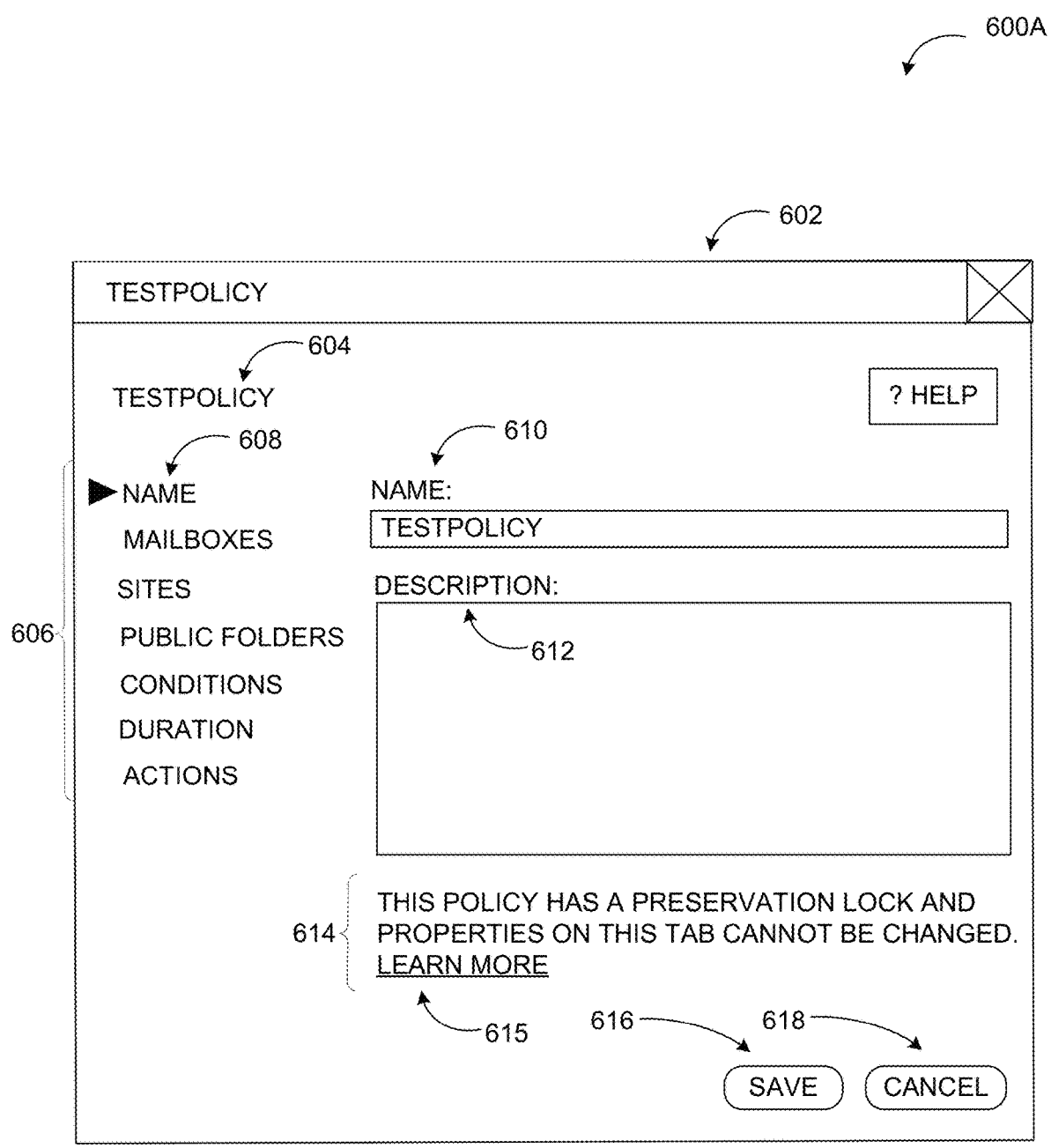
FIGS. 6A-C illustrate example user experiences provided for management of a preservation policy that is locked.
Figure 6B:
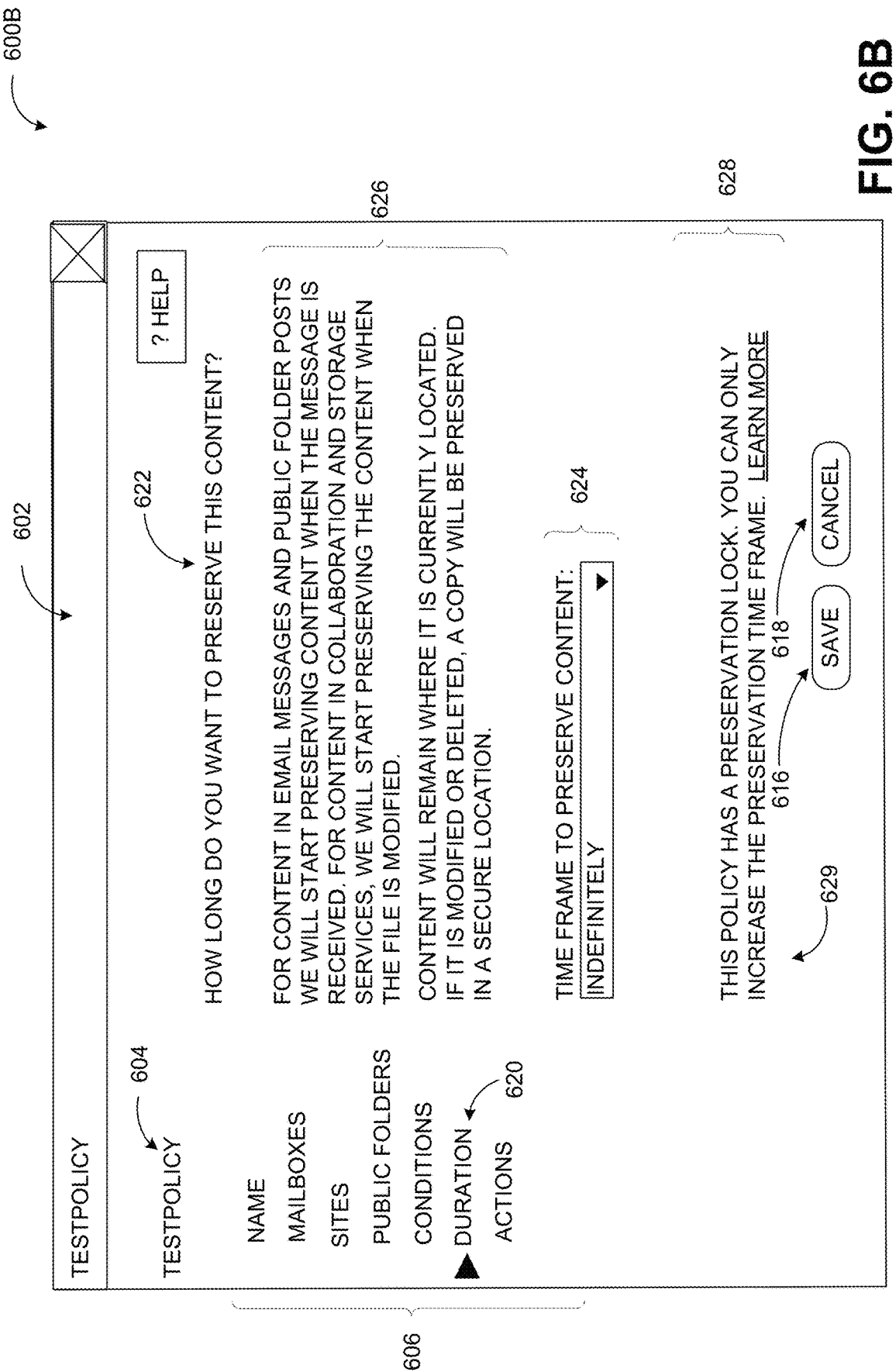
Figure 6C:
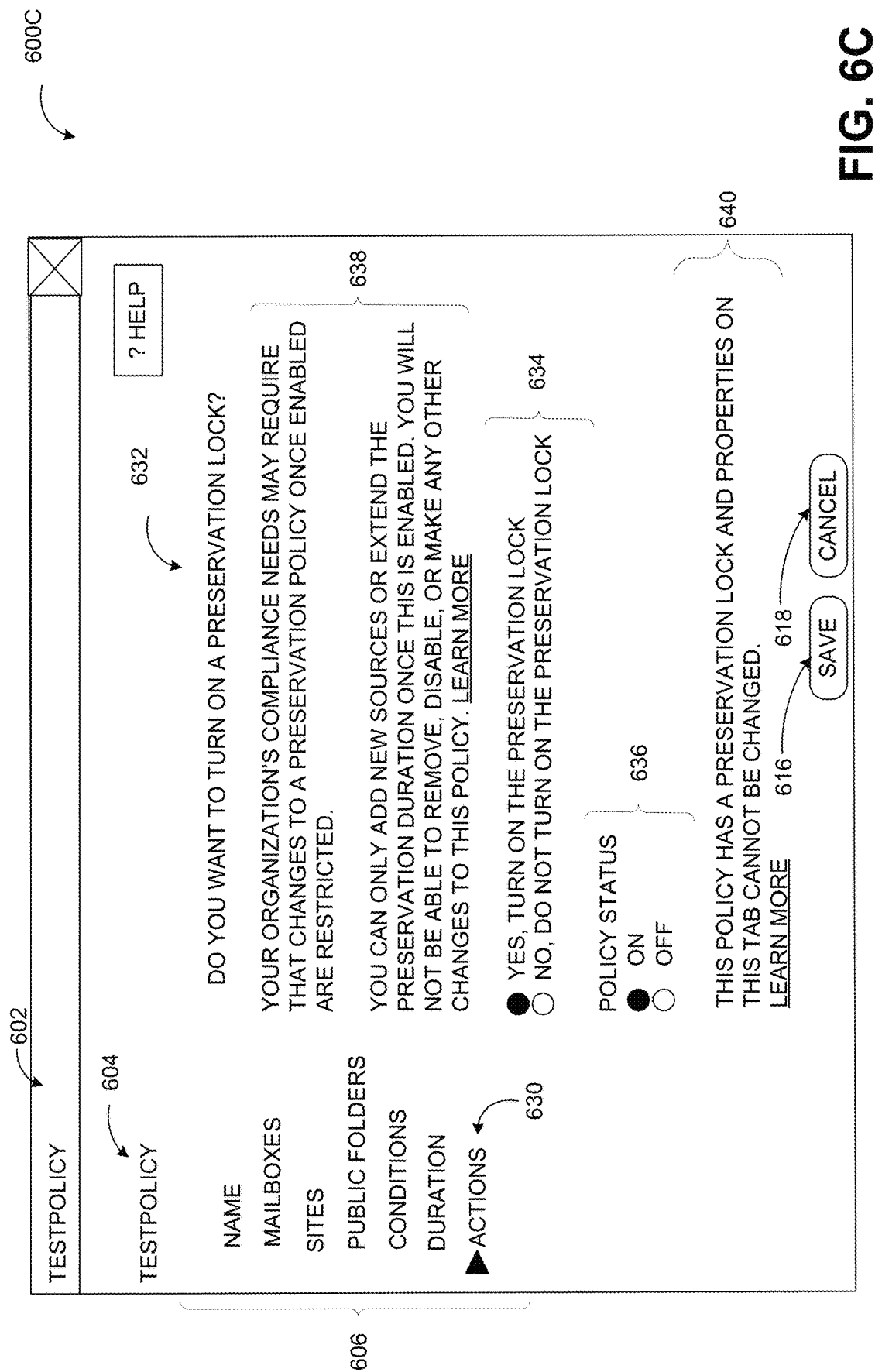

FIGS. 6A-C illustrate example user experiences provided for management of a preservation policy that is locked.

As previously discussed, a preservation module may provide an administrative user experience that enables a customer to create a preservation policy through a compliance application that is being executed on a computing device. The preservation policy may be define items to be preserved, and may be configured to have a preservation lock. After detecting enablement of the policy, the items may be preserved, the preservation lock on the policy may be initiated by disabling one or more controls associated with the policy, and an attribute may be set to the policy to identify the policy as locked. The administrative user experience provided to the customer may then be updated to indicate a recently enabled preservation policy as locked through a policy list view, as described in conjunction with FIG. 5.

Upon customer selection of the locked preservation policy through the policy list view, a separate user experience 602 may be provided for management of the selected policy, as shown in diagrams 600A-C. In diagram 600A-C, the user experience 602 may be provided for management of a test preservation policy 604 that has a preservation lock. The user experience 602 may include selectable tabs 606 associated with different features of the test preservation policy 604, such as name, mailboxes, sites, public folders, conditions, durations, and actions.

In diagram 600A, the name feature 608 of the test preservation policy 604 has been selected from the tabs 606 of the user experience 602. Both a name 610 ("testpolicy") and a description 612 may be displayed. A prompt 614 may also be displayed to indicate that this test preservation policy 604 has a preservation lock that has been initiated, and as a result none of the properties of the name feature 608 may be changed. A selectable link 615 to a site comprising more detailed information regarding the preservation lock may also be provided within the prompt 614. Two commands, a save command 616 and a cancel command 618, are also provided. However, because the test preservation policy 604 has the preservation lock, the save command 616 may be rejected if the customer attempts to change the name 610 or description 612, and selects the save command 616. In some embodiments, an error message may then be subsequently displayed comprising language similar to the prompt 614.

In diagram 600B, the duration feature 620 of the test preservation policy 604 has been selected from the tabs 606 of the user experience 602. A main instruction 622 of the duration feature 620 may include how long to preserve content of the items defined by the test preservation policy 604. A drop-down menu 624 may be provided to enable the customer to select the length of time to preserve the content. For example, the customer may have selected an indefinite time period, as shown, or may choose hourly, daily, monthly or yearly options based on the compliance needs of the customer. A first prompt 626 with more detailed information associated with the content preservation may be included through the duration feature 620. For example, the first prompt 626 may inform the customer that the items are preserved upon detection of a modification to content of the items or upon receipt of the items based on a type of each of the items. For example, if the item is an email message it is preserved upon receipt, and if the item is a file, it is preserved upon detection of a modification to content within the file. A second prompt 628 alerts the customer to the fact that the test preservation policy 604 has a preservation lock, and therefore the customer is limited to increasing the length of time the content is preserved from the time set when the test preservation policy 604 was created. A selectable link 629 to a site comprising more detailed information regarding the preservation lock may also be provided within the second prompt 628. The save command 616 and cancel command 618 are again provided. If the customer attempts to decrease the length of time the content is preserved from the time set when the test preservation policy 604 was created, and selects the save command 616, the save command 616 may be rejected. In some embodiments, an error message may then be subsequently displayed comprising language similar to the second prompt 628.

In diagram 600C, the actions feature 630 of the test preservation policy 604 has been selected from the tabs 606 of the user experience 602. A main instruction 632 of the actions feature 630 may include whether to configure the test preservation policy 604 to have preservation lock. The main instruction 632 may be in the form of a question, "Do you want to turn on a preservation lock?," and at least two selectable controls 634 may be provided to enable the customer to respond "yes" or "no" to the main instruction 632, in addition to a policy status 364 to enable the customer to select whether the policy is "on" or "off." As shown, one of the controls 634 that corresponds to a "yes" response and a policy status 636 of "on" are already selected because the test preservation policy 604 has a preservation lock that has been initiated. A first prompt 638 with more detailed information associated with the preservation lock may be included through the actions feature 630. For example, the first prompt 638 may inform the customer that restricting changes to the preservation policy may be required for compliance needs. The first prompt 638 may also inform the customer that only new items may be added to the preservation policy and a duration of a lock (or restriction) on the policy may only be increased. A selectable link to a site comprising more detailed information regarding preservation locks may further be provided. A second prompt 640 alerts the customer to the fact that the test preservation policy 604 has a preservation lock, and therefore no changes can to be to the actions feature 630. The save command 616 and cancel command 618 are again provided. If the customer attempts to revoke the preservation lock by changing the controls 634 to correspond to a "no" response to the main instruction 632, and selects the save command 616, the save command 616 may be rejected. Additionally, if the customer attempts to turn off the test preservation policy 604 by selecting the policy status 636 of "off", and selects the save command 616, the save command 616 may be rejected. In some embodiments, an error message may then be subsequently displayed comprising language similar to the second prompt 640.

The examples provided in FIGS. 1 through 6A-C are illustrated with specific systems, services, applications, modules, and user experience configurations. Embodiments are not limited to environments according to these examples. Provision of content immutability for regulated compliance may be implemented in environments employing fewer or additional systems, services, applications, modules, and user experience configurations. Furthermore, the example systems, services, applications, modules, and user experience configurations shown in FIG. 1 through 6A-C may be implemented in a similar manner with other values using the principles described herein.

Figure 7:
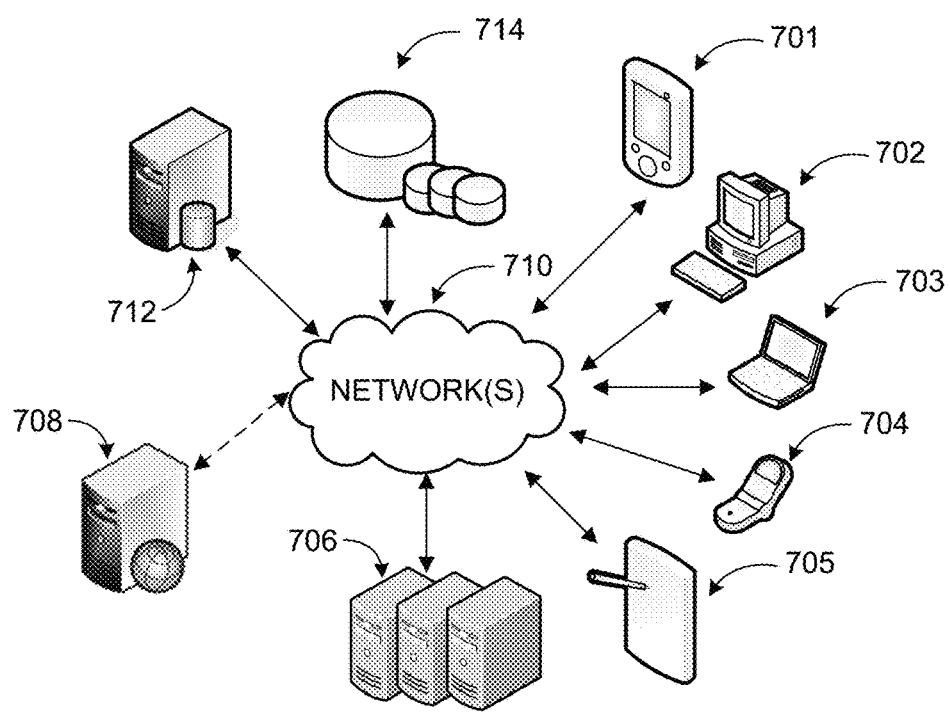
FIG. 7 is a networked environment, where a system according to embodiments may be implemented.

FIG. 7 is a networked environment, where a system according to embodiments may be implemented. In addition to locally installed applications (for example, compliance application 206), a preservation module may also be employed in conjunction with hosted applications and services (for example, a compliance application and/or a data management service) that may be implemented via software executed over one or more servers 706 or individual server 708. A hosted service or application may communicate with client applications on individual computing devices such as a handheld computer 701, a desktop computer 702, a laptop computer 703, a smart phone 704, a tablet computer (or slate), 705 (client devices') through network(s) 710 and control a user interface presented to users.

Client devices 701-705 are used to access the functionality provided by the hosted service or application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to provide content immutability for regulated compliance. Furthermore, the networked environments discussed in FIG. 7 are for illustration purposes only. Embodiments are not limited to the example applications, modules, or processes.

Figure 8:
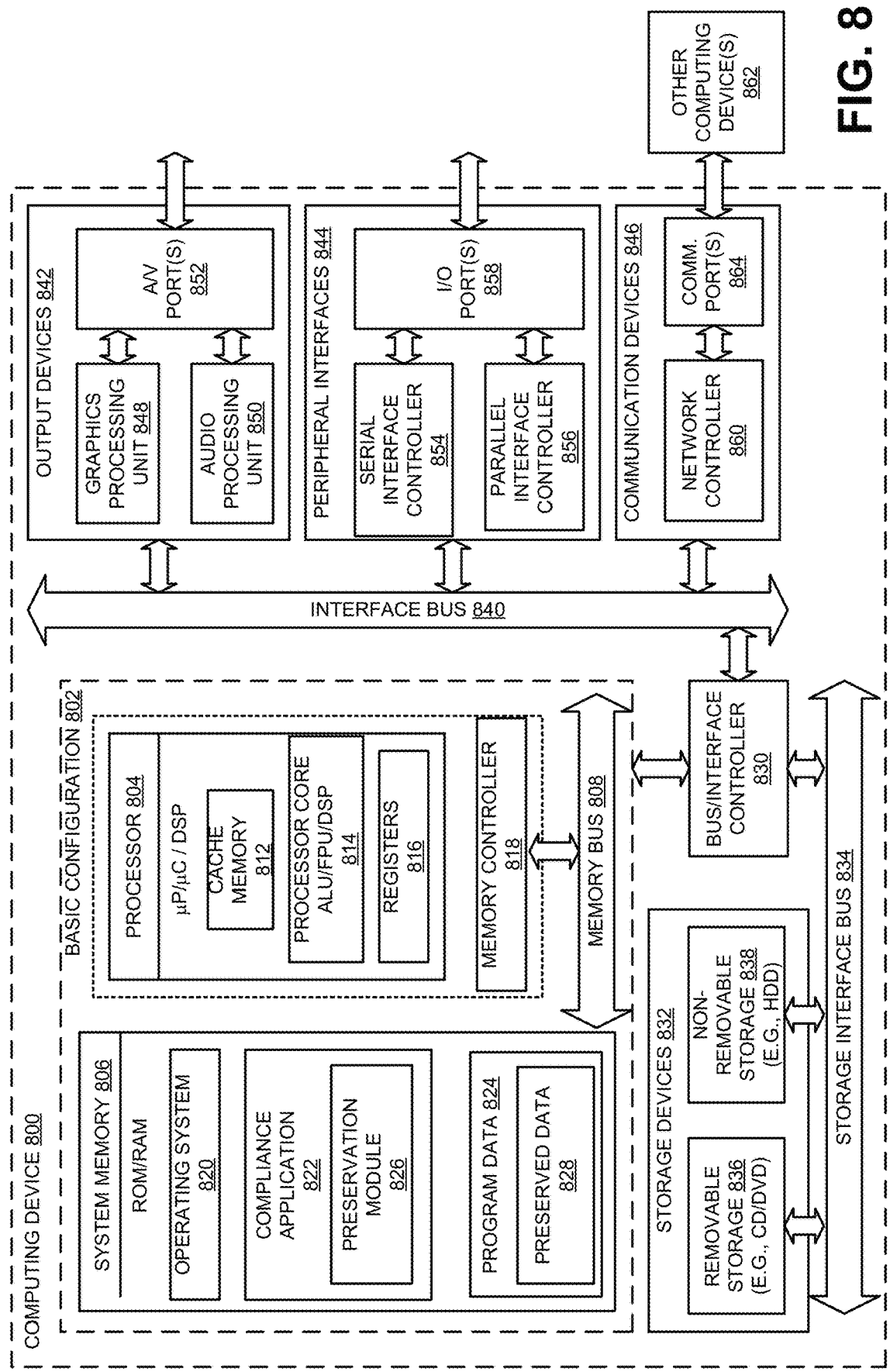
FIG. 8 is a block diagram of an example general purpose computing device, which may be used to provide content immutability for regulated compliance.

FIG. 8 is a block diagram of an example general purpose computing device, which may be used to provide content immutability for regulated compliance.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a compliance application 822, and program data 824. The compliance application 822 may include a preservation module 826, which may be an integrated module of the compliance application 822. The preservation module 826 may be configured to provide an administrative user experience to enable a customer to create a preservation policy. After detecting enablement of the preservation policy through the administrative user experience, the preservation module may then preserve item(s) defined by the preservation policy, initiate a preservation lock on the preservation policy, and set an attribute to the preservation policy to identify the preservation policy as locked. Preservation of the items may prevent content of the items from being overwritten, erased, and/or altered, and the lock on the preservation policy may prevent alteration and/or revocation of the preservation policy for a duration of the lock as required by compliance regulations. The program data 824 may include, among other data, preserved data 828, such as content of the preserved items, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to provide content immutability for regulated compliance. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
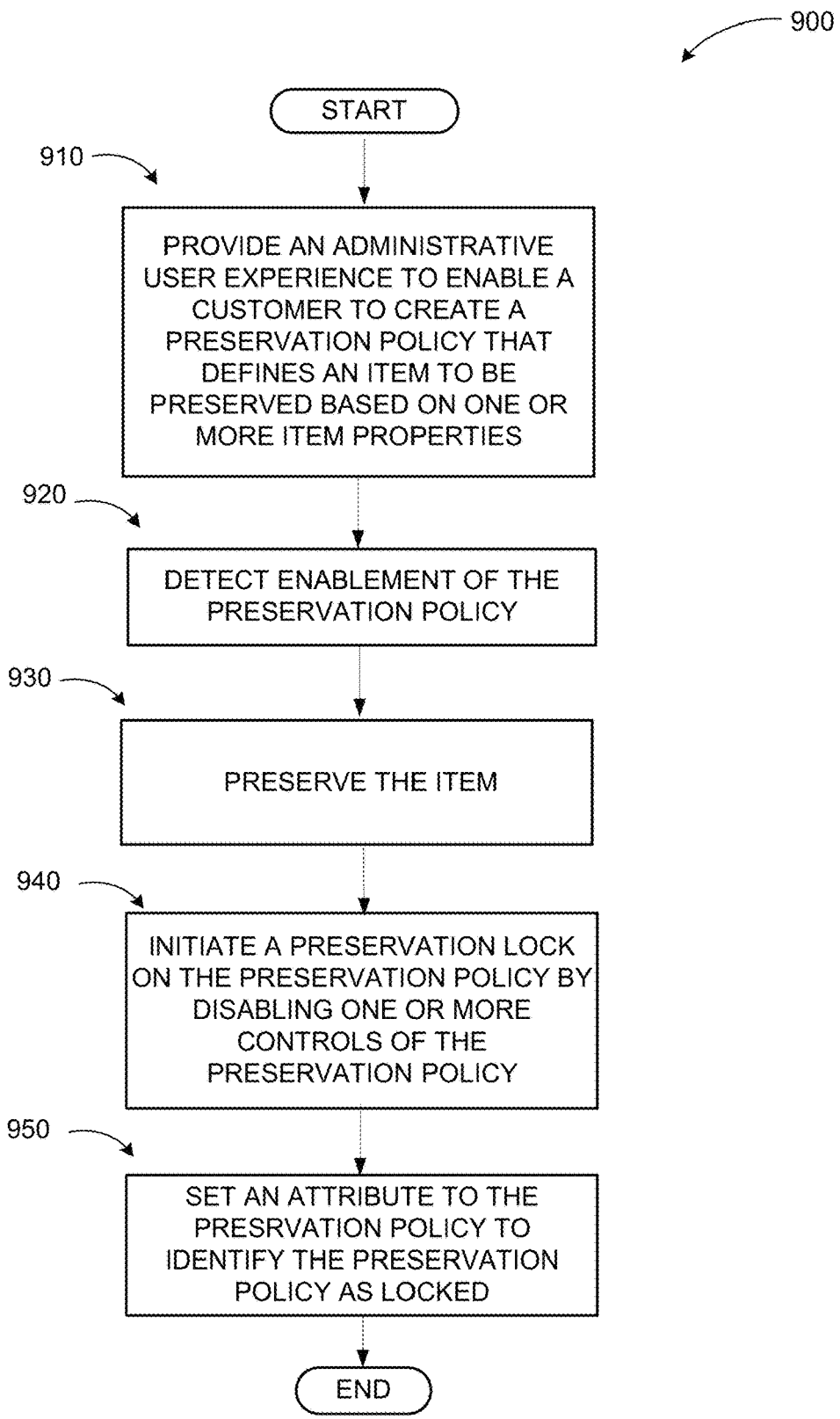
FIG. 9 illustrates a logic flow diagram of a method to provide content immutability for regulated compliance, according to embodiments.

FIG. 9 illustrates a logic flow diagram of a method to provide content immutability for regulated compliance, according to embodiments.

Process 900 may be implemented on a computing device, server, or other system. An example system may include a data management server comprising, among other components, one or more processors configured to execute a compliance application and a preservation module integrated with the compliance application. A customer may be enabled to interact with the compliance application through an input device or a touch enabled display of a computing device.

Process 900 begins with operation 910, where the preservation module may be configured to provide an administrative user experience to enable a customer to create a preservation policy. The preservation policy may define an item to be preserved based on one or more item properties, and may be configured to have a preservation lock. The item may include a mailbox, an email message, a site, a document, a file, a folder, or third-party data, and the item properties may include an organization, a group, a user, a location, a folder type, a file type, a document type, and/or a data type, for example. At operation 920, the preservation module may be configured to detect that the preservation policy has been enabled through the administrative user experience. In response to enablement of the preservation policy, operations 930-950 may be executed.

At operation 930, the preservation module may be configured to preserve the item to prevent one or more of overwriting, erasure, and alteration of content of the item as required for regulated compliance. The item may be preserved upon detection of a modification to content of the item or upon receipt of the item based on a type of the item, for example.

At operation 940, the preservation module may initiate the preservation lock on the preservation policy by disabling one or more controls associated with the preservation policy to prevent alteration and/or revocation of the preservation policy for a duration of the lock as further required for regulated compliance. The disabled controls may include controls configured to decrease the duration of the lock, to remove items from the preservation policy, and to revoke or turn off the preservation policy, where the latter two controls may be re-enabled following expiration of the duration of the lock. However, controls configured to increase the duration of the lock, and add items to the preservation policy may be maintained throughout the duration of the lock.

At operation 950, the preservation module may be configured to set an attribute to the preservation policy to identify the preservation policy as locked. In some embodiments, the preservation module may then be configured to update the administrative user experience provided to the customer to indicate a current status of the preservation policy as "ON" or "LOCKED". Additionally, the preservation module may be configured to collect and provide for display metadata associated with the lock, such as a date and a time the preservation policy was locked, the customer who created the lock, the preserved items defined by the locked preservation policy, and the duration of the lock.

The operations included in process 900 are for illustration purposes. Provision of content immutability for regulated compliance may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means to provide content immutability may be provided, where the means may include providing an administrative user experience to enable a customer to create a preservation policy that defines an item to be preserved based on one or more item properties, where the preservation policy may be configured to have a preservation lock. The means may also include detecting enablement of the preservation policy through the administrative user experience, preserving the item to prevent content of the item from being one or more of overwritten, erased, and altered, and initiating the preservation lock on the preservation policy by disabling one or more controls associated with the preservation policy to prevent one of alteration and revocation of the preservation policy for a duration of the lock. The means may further include setting an attribute to the preservation policy to identify the preservation policy as locked.

According to some examples, methods to provide content immutability may be provided. An example method may include providing an administrative user experience to enable a customer to create a preservation policy that defines an item to be preserved based on one or more item properties, where the preservation policy may be configured to have a preservation lock. The method may also include detecting enablement of the preservation policy through the administrative user experience, preserving the item to prevent content of the item from being one or more of overwritten, erased, and altered, and initiating the preservation lock on the preservation policy by disabling one or more controls associated with the preservation policy to prevent one of alteration and revocation of the preservation policy for a duration of the lock. The method may further include setting an attribute to the preservation policy to identify the preservation policy as locked.

In other examples, the item may include a mailbox, an email message, a site, a document, a file, a folder, and/or third-party data. The one or more item properties may include an organization, a group, a user, a location, a folder type, a file type, a document type, and/or a data type. The preservation policy and one or more other preservation policies may be displayed and managed through the administrative user experience. The administrative user experience may be iteratively updated to indicate a current status of the preservation policy and the other preservation policies.

Metadata associated with the preservation lock may be collected, and the metadata may be provided to be displayed through the administrative user experience, where the metadata may include a date and a time the preservation lock was initiated, a user who created the preservation lock, one or more items preserved by the preservation lock, and/or the duration of the preservation lock.

In further examples, disabling the controls associated with the preservation policy includes disabling a control configured to decrease the duration of the preservation lock, disabling another control configured to remove the item from the preservation policy, and/or disabling a further control configured to revoke one or more of the preservation lock and the preservation policy. An error message may be provided to be displayed through the administrative user experience in response to detecting an attempt to actuate at least one of the control, the other control, and the further control. The other control and the further control may be re-enabled after the duration of the preservation lock has expired. A control configured to increase the duration of the preservation lock and a control configured to add one or more other items to the preservation policy may be maintained.

According to some embodiments, systems to provide content immutability may be described. An example system may include a communication interface configured to facilitate transmission of content between a data management server and a storage server. The data management server may include a memory configured to store instructions and one or more processors coupled to the memory, where the one or more processors may be configured to execute, in conjunction with the instructions stored in the memory, a compliance application and a preservation module integrated with the compliance application. The preservation module may be configured to provide an administrative user experience to enable a customer to create a preservation policy that defines an item to be preserved based on one or more item properties, where the preservation policy may be configured to have a preservation lock, and detect enablement of the preservation policy through the administrative user experience. The preservation module may also be configured to preserve the item to prevent content of the item from being one or more of overwritten, erased, and altered, initiate the preservation lock on the preservation policy by disabling one or more controls associated with the preservation policy to prevent one of alteration and revocation of the preservation policy for a duration of the lock, and set an attribute to the preservation policy to identify the preservation policy as locked. The storage server may be configured to store a copy of the content of the item for at least the duration of the preservation lock.

In other embodiments, the preservation policy may be synchronized with one or more collaboration services associated with the data management server through the communication interface. The item may be preserved upon detection of a modification to the content of the item; or upon receipt of the item. The preservation policy may be combined with a retention policy such that the item is deleted in accordance with the retention policy after the duration of the preservation lock has expired. Third party data may be retrieved from external sources based on a customer-defined scope of third party data to be protected by the preservation policy, and the third-party data may be added to the preservation policy such that the third party data is preserved.

According to some examples, a computer readable memory device with instructions stored thereon to provide content immutability may be described. Example instructions may include providing an administrative user experience to enable a customer to create a preservation policy that defines an item to be preserved based on one or more item properties, where the preservation policy may be configured to have a preservation lock, and detecting enablement of the preservation policy through the administrative user experience. The instructions may also include preserving the item to prevent content of the item from being one or more of overwritten, erased, and altered, where the item preserved upon detection of a modification to the content of the item or upon receipt of the item based on a type of the item, and initiating the preservation lock on the preservation policy by disabling one or more controls associated with the preservation policy to prevent one of alteration and revocation of the preservation policy for a duration of the preservation lock, where the disabled controls may include a control configured to decrease the duration of the lock, another control configured to remove the item from the preservation policy, and a further control configured to revoke the preservation lock and/or the preservation policy. The instructions may further include setting an attribute to the preservation policy to identify the preservation policy as locked.

In other examples, the preservation policy may be audited to determine compliance with industry regulations. The item and one or more other items within the preservation policy may be enabled to be queried.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed by a hardware processor to provide content immutability, the method comprising:
    detecting selection of a first control associated with a first period of time;
    detecting selection of a second control associated with a second period of time;
    in response to detecting selection of a third control included in a user interface:
        enabling a preservation policy defining an item based on one or more item properties,
        preserving, according to the preservation policy, the item for the first period of time, and
        disabling, for the second period of time, a fourth control associated with altering or revoking the preservation policy; and
    in response to expiration of the second period of time, re-enabling the fourth control associated with altering or revoking the preservation policy.

2. The method of claim 1, wherein the item includes one or more of a mailbox, an email message, a site, a document, a file, a folder, and third-party data.

3. The method of claim 1, wherein the one or more item properties include one or more of an organization, a group, a user, a location, a folder type, a file type, a document type, and a data type.

4. The method of claim 1, further comprising:
    presenting the preservation policy and one or more other preservation policies within the user interface.

5. The method of claim 4, further comprising:
iteratively indicating a current status of the preservation policy and the one or more other preservation policies within the user interface.

6. The method of claim 1, further comprising:
collecting metadata associated with the preservation policy; and
providing the metadata within the user interface.

7. The method of claim 6, wherein the metadata includes one or more of a date and a time the preservation policy was enabled, a user who enabled the preservation policy, one or more items preserved by the preservation policy, and the second period of time.

8. The method of claim 1, wherein disabling the fourth control associated with altering or revoking the preservation policy comprises:
disabling a control configured to decrease the second period of time; and
further comprising:
disabling a fifth control configured to remove the item from the preservation policy; and
disabling a sixth control configured to revoke one or more of the second period of time and the preservation policy.

9. The method of claim 8, further comprising:
providing an error message within the user interface in response to detecting an attempt to actuate at least one of the fourth control, the fifth control, and the sixth control during the second period of time.

10. The method of claim 8, further comprising:
re-enabling the fifth control and the sixth control after the second period of time has expired.

11. The method of claim 1, further comprising:
providing, during the second period of time, a fifth control configured to increase the second period of time.

12. The method of claim 1, further comprising:
providing a fifth control configured to add one or more other items to the preservation policy.

13. A system to provide content immutability, the system comprising:
a memory configured to store instructions; and
one or more hardware processors coupled to the memory, the one or more processors configured, via execution of the instructions stored in the memory, to:
detect selection of a first control associated with a first period of time;
detect selection of a second control associated with a second period of time;
in response to detecting selection of a third control included in a user interface:
enable a preservation policy defining an item based on one or more item properties,
preserve, according to the preservation policy, the item for the first period of time, and
disable, for the second period of time, a fourth control associated with altering or revoking the preservation policy; and
in response to expiration of the second period of time, re-enable the fourth control associated with altering or revoking the preservation policy.

14. The system of claim 13, wherein the one or more hardware processors are further configured to:
synchronize the preservation policy with one or more collaboration services associated with the one or more hardware processers through a communication interface.

15. The system of claim 13, wherein the one or more hardware processors are configured to preserve the item in response to one of:
detecting a modification to content of the item; and
receiving the item.

16. The system of claim 13, wherein the one or more hardware processors are further configured to:
delete, after expiration of the first period of time, the item in accordance with a retention policy.

17. The system of claim 13, wherein the one or more hardware processors are further configured to:
retrieve third party data from external sources based on a customer-defined scope of third party data to be protected by the preservation policy; and
preserve the third party data according to the preservation policy.

18. A non-transitory computer readable memory device with instructions stored thereon to provide content immutability, the instructions, when executed by one or more electronic processors, performing a set of functions comprising:
in response to detecting selection of a first control included in a user interface:
enabling a preservation policy defining an item based on one or more item properties,
preserving, according to the preservation policy, the item for a first period of time, and
disabling, for a second period of time, a second control associated with altering or revoking the preservation policy; and
in response to expiration of the second period of time, re-enabling the second control associated with altering or revoking the preservation policy.

19. The non-transitory computer readable memory device of claim 18, the set of functions further comprising:
auditing the preservation policy with respect to an industry regulation.

20. The non-transitory computer readable memory device of claim 18, the set of functions further comprising:
during the first period of time, enabling the item to be queried.

\* \* \* \* \*